(12) United States Patent
Towers et al.

(10) Patent No.: US 8,228,591 B1
(45) Date of Patent: Jul. 24, 2012

(54) HANDHELD OPTICS DETECTION SYSTEM

(75) Inventors: Ross Towers, Stanhope, NJ (US); Deepak Bupathi, East Brunswick, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 645 days.

(21) Appl. No.: 12/481,773

(22) Filed: Jun. 10, 2009

Related U.S. Application Data

(63) Continuation of application No. 61/060,215, filed on Jun. 10, 2008.

(51) Int. Cl.
*G02F 1/153* (2006.01)
*G06K 7/10* (2006.01)

(52) U.S. Cl. ........................ 359/275; 235/454

(58) Field of Classification Search .................. 359/275; 235/404, 454
See application file for complete search history.

(56) References Cited

U.S. PATENT DOCUMENTS 7,909,253 B2 * 3/2011 Sherman ........................ 235/454

* cited by examiner

*Primary Examiner* — William Choi
(74) *Attorney, Agent, or Firm* — Henry S. Goldfine

(57) ABSTRACT

An active imaging retroreflection based optical system for the detection of other optical systems, especially passive optics used for observation/surveillance, or targeting. The active imaging system is switchable from either near-IR laser illumination, to a combination of near-IR and visible laser light illumination. The illumination is shaped into narrow elongated beams, generally elliptical in shape. These beams are channeled by rhomboid prisms so as to be emitted collimated to each other and monostatic to the detection system, such that the retroreflected return image returns axially to the optical detection system. The return image is resolved and refined by a series of objective and field lenses, and by a dual band, visible light and near-IR, pass filter, to add clarity and contrast. The energy is further enhanced by being amplified by a highly sensitive detector, such as a third generation imager; or a high sensitivity, back-illuminated CCD (charge coupled device); or a high sensitivity wide dynamic range CMOS (complimentary metal-oxide semiconductor) sensor. The retroreflected energy, processed by this third generation imager, or the like, appears as a concentrated point of light, or bright spot, that can be quickly and easily distinguished from its surroundings, which also appear to the user.

10 Claims, 5 Drawing Sheets

HANDHELD OPTICS DETECTION SYSTEM

CROSS-REFERENCE TO RELATED APPLICATIONS

This application claims the benefit under 35 USC §119(e) of U.S. provisional patent application 61/060,215, filed on Jun. 10, 2008, which provisional application is hereby incorporated by reference.

FEDERAL RESEARCH STATEMENT

The inventions described herein may be manufactured, used, and/or licensed by the U.S. Government for U.S. Government purposes.

FIELD OF THE INVENTION

The present invention relates to a collimated, monostatic, retroreflection based optical system for detecting optical devices, and more particularly the detection of sniper and other threat optics using a highly sensitive detection system.

BACKGROUND OF THE INVENTION

One of the most common ways to classify imaging systems is as to whether they are "passive" or "active." Classical Galilean and Keplerian telescopes, and binoculars, are passive systems, which gather ambient light to magnify the image of objects of interest. Such systems are for surveillance and overall situational awareness purposes; as they will not highlight anything in particular within their field of view (other than a flash or bright reflection), and as they are not usable at night to distinguish dark images blended into a dark background. More modern night vision systems are also generally passive, utilizing ambient light reflected or thermal signals emitted from the object of interest being observed; such passive systems do not send out any energy; but, only act as a receiver. By way of contrast, imaging systems that emit energy, where the energy impinges upon and is reflected from the object for detection, is an active system.

Image intensifiers are well known for their ability to enhance night-time vision by multiplying the amount of ambient incident light, to produce a brighter, more intense image, yet, still, are passive systems. Such devices are particularly useful for enhancing images from dark regions for both industrial and military applications. The U.S. military uses image intensifiers during night time operations for viewing (i.e. detecting, recognizing, identifying) and aiming at targets that would not be otherwise visible. As stated, night ambient radiation (star and/or street lighting) is reflected from the target and the reflected energy is amplified by the image intensifier to make the target image visible. Other examples of image intensifier applications include: enhancing the night vision of pilots; providing night vision to suffers of retinitis pigmentosa (night blindness); and use in astronomical observation and photography.

A typical image intensifier, as disclosed in U.S. Pat. No. 5,146,077 to Caserta et al., includes an objective lens, which focuses visible and infrared radiation from an object onto a photocathode (the "signal"). The photocathode, a photoemissive wafer, is extremely sensitive to low-radiation levels of light in the 580-900 nm spectral range, emitting electrons in response to the electromagnetic radiation signal/energy focused thereon. Electrons emitted from the photocathode are accelerated toward a phosphor screen (an anode), which is maintained at a higher positive potential than the photocathode. A micro-channel plate ("MCP"), formed of many thousands of individual hollow glass fibers with a NiChrome electrode on either side, is located between the photocathode and the phosphor screen. A large 1000V potential is applied across this thin MCP, such that when electrons strike and pass through it, additional secondary electrons are released, amplifying the signal up to 30,000 times. Using multiple MCP layers, amplification of well over 1,000,000 times is possible. The phosphor screen converts the electron emission into visible light for observation by an operator.

The latest image intensifiers are referred to as third generation image intensifiers, use GaAs/CsO/AlGaAs photocathodes. They are more sensitive than prior photocathodes in the 800-900 nm spectral range—thereby providing higher low light sensitivity, greater than 900 µA/lm. As further disclosed in U.S. Pat. No. 5,146,077, to protect the GaAs photocathode from bombardment by positive ions emitted by the MCP, the MCP is coated with a thin aluminum oxide film. Third generation image intensifier tubes are manufactured by a variety of sources, including but not limited to Litton Corporation and ITT Corporation, and are incorporated into products such as the AN/PVS-14 Monocular Night Vision Device (MNVD). The AN/PVS-14 is used around the world by the U.S. and NATO armed forces.

A very general, active imaging system, incorporated herein by reference, is disclosed in U.S. Pat. No. 6,603,134, to Wild et al., wherein a radiant energy source, including light energy, radio frequency energy, microwave energy, acoustical energy, X-ray energy, or heat energy, is retroreflected from an object to detect that object. Retro-reflection is defined by Wild et al. as a reflector wherein incident rays or radiant energy and reflected rays are parallel for any angle of incidence within the field-of-view. It is also disclosed that a characteristic of a retroreflector is that the energy impinging thereon is reflected in a very narrow beam, a characteristic observed when such energy impinges the human eye or optical instruments, such as binoculars, telescopes, periscopes, range finders, cameras, and the like. Such a reflected, parallel, very narrow beam, can be termed to be collimated—wherein the rays within the beam are nearly parallel and spread slow with minimal dispersion.

U.S. Pat. Publication 2005/0033186, by Nordstrom et al., discloses an active system wherein the illuminating beam and the receiving beam reflected from the object of interest lie essentially along the same line of sight. By scientific definition, this system would be a "monostatic" system. In contrast, a bistatic system is one in which the illuminating beam is focused on the object from a source location and the light that is reflected, backscattered, or emitted from the object is received by an optical system situated a certain distance from the illumination source. In this configuration, the angle between the source and emitter relative to the object being illuminated is referred to as the "bistatic angle." By logical extension, therefore, when the bistatic angle is zero, the system is defined as "monostatic." As disclosed in this published patent application, for many applications, the bistatic configuration is not useful. For example, with a bistatic observation, contours within the object may cause shadowing of the response from the surface of the object to the receiver, or may cause overlap of the receiver line of sight, and the illumination line of sight to fall off the surface. It is further understood that misalignment problems can be overcome by the use of monostatic optical configurations and as discussed herein, any significantly increased angle from a monostatic configuration can significantly reduce the retroreflection detection of sniper scopes or other optics.

There is a need in the art to observe potentially critical objects, such as sniper scopes, which are often not distinguishable from the background environment by current passive or active retroreflection based optics, even those including $3^{rd}$ generation image intensifiers or the like. Further, there is especially such a need for detection of sniper scopes during the daylight, where current $3^{rd}$ generation image intensifiers, and the like, are not intended to function The above objectives as well as other objectives, features, and advantages of the present invention will become more apparent from the following detailed discussion when considered in conjunction with the drawings and claims presented.

SUMMARY OF THE INVENTION

The present invention is an active imaging retroreflection based optical system for the detection of other optical systems, particularly "threat optics" such as sniper scopes, military grade binoculars, and digital targeting equipment. The active imaging system is switchable from either near-IR illumination, to a combination of near-IR and visible light illumination. The illumination is shaped into narrow elongated beams, generally elliptical in shape. The beams are channeled by rhomboid prisms so as to be emitted collimated to each other and monostatic relative to the detector; the prisms effectively locate the emitting aperture of the lasers near the center of the collecting aperture of the detector. The return image is resolved and refined by a series of objective and field lenses, and by a dual band, visible light and near-IR, pass filter, to add clarity and contrast. It is further enhanced by being amplified by a highly sensitive detector, such as a third generation imager; or a high sensitivity, back-illuminated CCD (charge coupled device); or a high sensitivity wide dynamic range CMOS (complimentary metal-oxide semiconductor) sensor. The retroreflected image, processed by this third generation imager, or the like, appears as a concentrated point of light, or bright spot, that can be quickly and easily distinguished from its surroundings, which also appear to the user.

Use of shaped, monostatic, beams from a combination of lasers, i.e. a visible laser with a wavelength of about 380 to about 750 nm, and a near-IR laser with a wavelength of about 800 to about 2500 nm, causes, with the objective and field lenses and filtering disclosed herein, an intense retroreflective image from an optic with an internal focal plane or focal plane array, such as a sniper scope, camera, or digital recorder. Importantly, an adequate, but lesser retroflection, is obtained by solely using a near-IR laser—such that the visible laser source need not be used at night, thereby avoiding the potential of revealing the position of the user of the subject device. Alternative wavelength lasers, such as mid-range IR, do not provide a retroreflective return of sufficient energy intensity from the optics being observed to ensure quick and easy detection.

The nature of the subject invention will be more clearly understood by reference to the following detailed description, the associated drawings, and the appended claims.

BRIEF DESCRIPTION OF THE DRAWINGS

In the drawings, which are not to scale, like or corresponding parts are denoted by like or corresponding reference numerals; further, certain standard, common features, that are well known in the art, such as selector switches and power supplies, are not shown the following schematic and conceptual drawings (and are correspondingly, not detailed in this specification).

DETAILED DESCRIPTION

Figure 1:
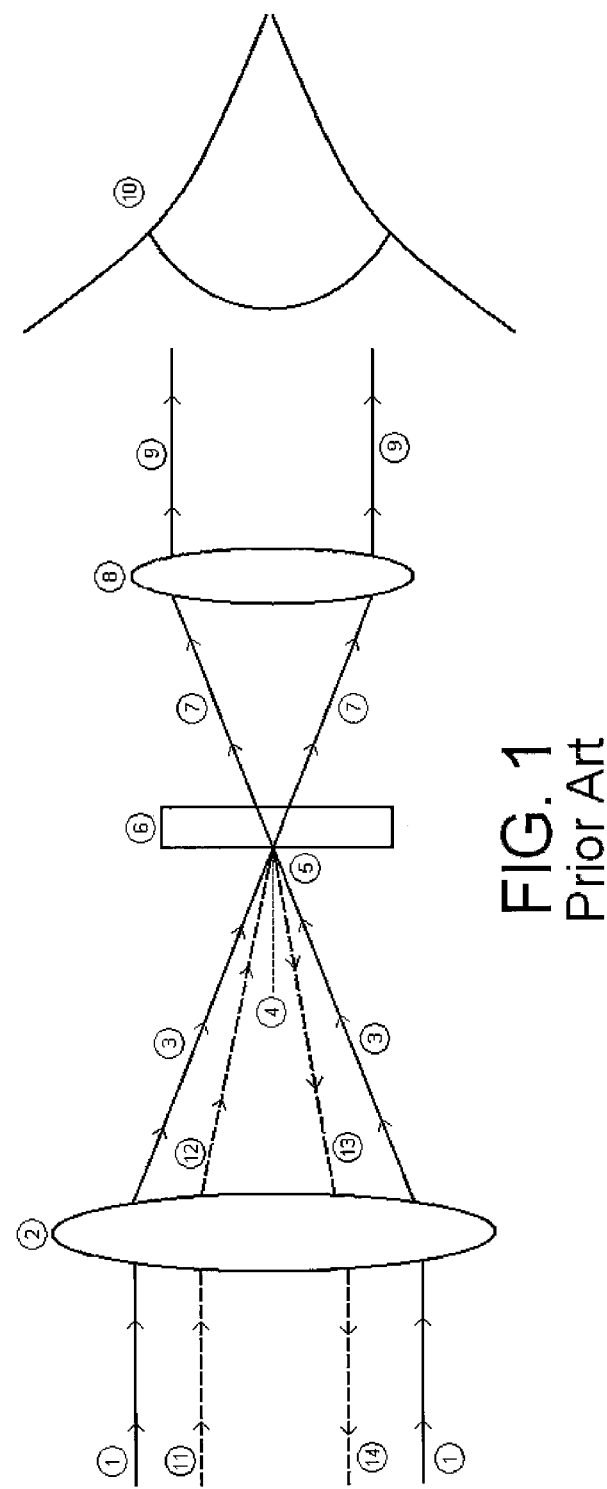
FIG. 1 is a schematic diagram of a retroreflective system, showing a Keplerian telescope of the prior art, with a reticle at the internal focal plane of the system.

A first embodiment of the present active imaging retroreflection detection system 100 invention, for the detection of optical systems, such as sniper scopes (hereinafter "target"), is shown schematically in FIG. 3. The present invention is switchable by the user to emit either a single, or a set of two laser beams, i.e. a near-IR laser beam, generated by a first near IR laser 35, or a combination of this near-IR beam and a second visible light laser 36. The switching system, which is well known in the art, is not shown in FIG. 3. These beams are shaped by diverging lenses, wedge prisms, and/or cylindrical lenses 37, 38 into narrow, elongated, generally elliptical in shape sensing beams 11, to maximize the power of the retroreflected beam (as discussed below), as well as, to limit the field of view, as to focus the users attention on and localize targets. The sensing beams 11 from the lasers 35, 36 are channeled by rhomboid prisms to be emitted collimated to each other and generally central to the front face of the objective lens 26, 27 of the retroflection detection system 100, such that the retroreflected return beam 14, from the detected optical system or target, is monostatic with respect to the emitted laser beams. Any retroreflected target image captured by the objective lens 26, 27, is channeled by a set of mirrors 18, 29 to a dual band (visible light and near IR) pass filter 30, to increase the contrast of the image, and then to a series of objective and field lenses to resolve and refine the retroreflected image 31, 32, 33, prior to being resolved by a highly sensitive detector 34, such as a third generation image intensification tube; or a high sensitivity, back-illuminated CCD; or a high sensitivity wide dynamic range CMOS sensor, to further resolve and amplify the final retroreflected target image. The final retroreflected target image, processed by this third generation imager, or the like, appears to the user as a concentrated point of light, or bright spot, that can be quickly and easily distinguished from its surroundings or background, which appear about the bright spot.

The present invention having such shaped, monostatic, sensing beams 11 from a combination of lasers 35, 36, i.e. a visible laser with a wavelength of about 380 to about 750 nm, and a near IR laser with a wavelength of about 800 to about 2500 nm, provides, with the objective and field lenses and filtering, an intense retroreflected image from the target. Importantly, an adequate, but less intense retroreflection, is obtained by solely using a near IR laser—such that the visible laser source need not be used at night, thereby not revealing the position of the user of the subject device. Alternative wavelength lasers, such as mid-range IR, do not provide the necessary retroreflective intensity from observed optics to ensure quick and easy target detection.

By contrast, FIG. 1, illustrates a passive telescopic optical device, wherein ambient light, initially reflected from a target as a diffuse reflected beam 1, is focused by the objective lens 2 of the telescope as beam 3 to a focal point 5, where 6 transmits it to an eyepiece 8 for observation by the user, i.e. a classical Keplerian telescope. A portion of beam 3 is retroreflected from the reticle 6 back to the object being observed as beam 13, 14, which are very diffuse beams; and if perchance, the object being observed contains a lens and is relatively close in proximity to this Keplerian telescope, there is potentially a retroreflection back to the telescope as beam 11, which would not normally be discernable to the user of the telescope.

Figure 2:
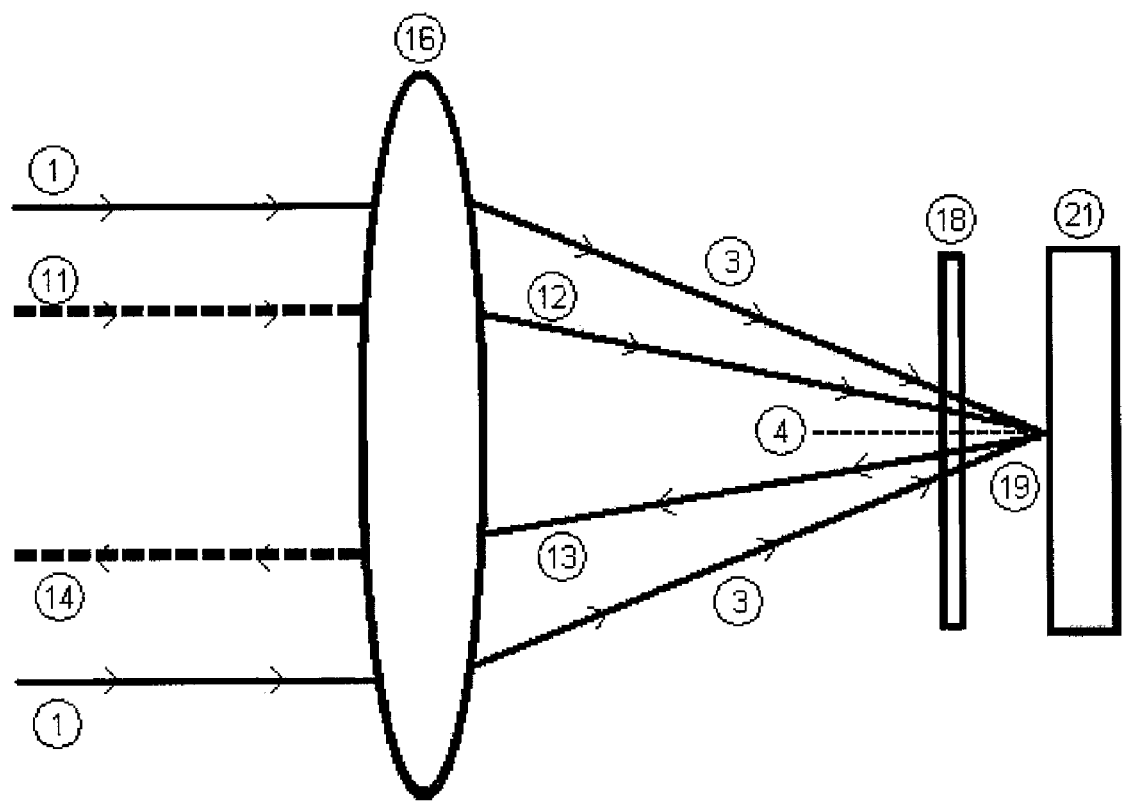
FIG. 2 is a schematic diagram of a retroreflective system, showing a typical camera lens being brought to focus on a sensor through a filter.

By further contrast, FIG. 2, illustrate a passive camera optical device, wherein ambient light, initially reflected from an object as a diffuse reflected beam 1, is focused by the objective lens 16 of the camera as beam 3, passed through a typical ultraviolet filter 18 to the camera's sensor (digital camera) or photographic film 21. As in the case of any optical device, there is some retroreflection, beam 13, 14, which exits the camera as a diffuse beam and which as in the case of FIG. 1, may be retroreflected from an optical object being observed as beam 11, which, also, as stated above, would not normally be discernable to the camera.

A particular visible light laser 36 applicable for use in the present invention would be a any of a variety of gas lasers, such as Argon-ion or Helium-Neon; any of a variety of solid state lasers, such as ruby or frequency doubled or tripled neodymium yttrium aluminum garnet; or any of a wide variety of semiconductor lasers, or laser diodes. Potential sources of such lasers are innumerable, and as such need not be explicitly stated. A particular near IR laser 35 applicable for use in the present invention would be a any of a variety of solid state lasers, such as titanium sapphire, neodymium yttrium aluminum garnet, or a wide variety of ytterbium doped lasers; or any of a wide variety of semiconductor lasers, or laser diodes. Potential sources of such lasers are also innumerable, need not be explicitly stated. These lasers can be powered by a conventional battery power source, which source would also power whatever highly sensitive detector device 34 being used, this conventional power source is not shown in FIG. 3. Further, as stated above, either the near-IR laser, or both the visible light and near-IR lasers can be selectively turned on by the user, using a conventional selector switch that completes an electrical circuit between a battery power source and only the near-IR laser; or, that completes an electrical circuit between the battery power source and both the visible light laser and near-IR lasers, to power-up only said near-IR, or both the near-IR and visible light lasers.

Figure 3:
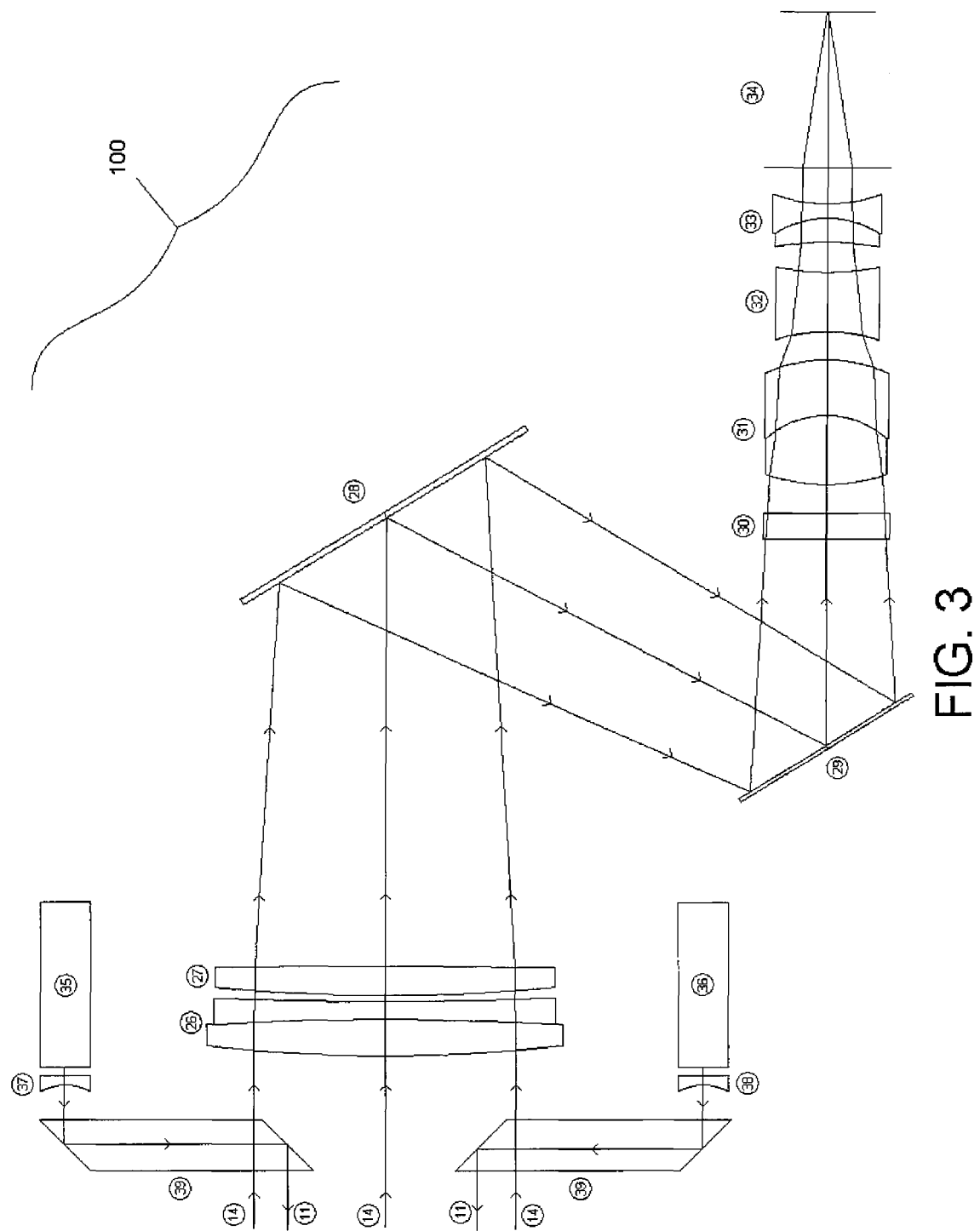
FIG. 3 is a schematic diagram of a retroreflection detection system of the present invention.
Figure 4:
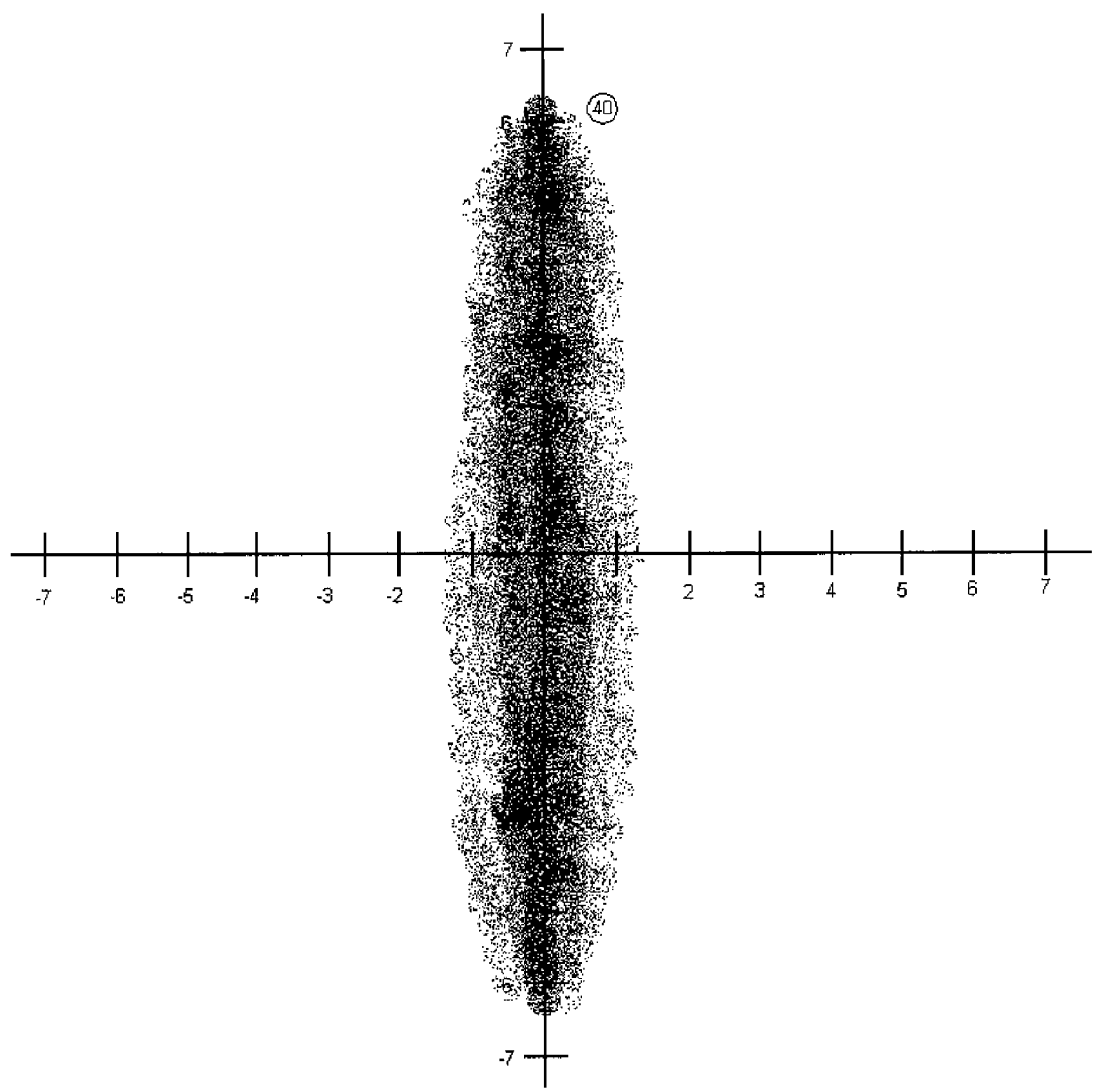
FIG. 4 is a graphical representation of the generally narrow, elongated section of radiant energy emitted by a retroreflection detection system of the present invention.

As shown in FIG. 3, upon exiting the lasers the beams are reshaped by divergent lenses 37, 38 to narrow, elongated, elliptical shapes, such as shown in FIG. 4. The particular output beam profile shown in FIG. 4 maximizes the power, $P_r$, of the sensing beam 11 on target, while minimizing the total power required and balancing the user's need to resolve the retroreflected return beam 14 for a period long enough for his brain to register that return. The formula for the retroreflected return beam 14 power is:

$$P_r = (P_{laser} D_{sen}^2 \sigma_t \tau_a^2 \tau_t \tau_s)/(\theta_T^2 R^4)$$

Where, $P_{laser}$ is the output power of the laser, $D_{sen}$ is the diameter of the sensor optic, $\sigma_t$ is the optical cross section of the target system, $\theta_T$ is the full angle of the transmitted beam divergence, R is the range at which the target is being sensed, $\tau_a$ corresponds to the transmission loss due to the atmosphere, $\tau_t$ corresponds to the transmission loss from the transmitter, and $\tau_s$ corresponds to the transmission loss from the sensor.

By minimizing the beam divergence, $\theta_T$, and shaping the output sensing beam 11 as shown in FIG. 4, the effective power of the subject retroreflective detection system 100 is increased and the ability of the user to easily and quickly identify a target is improved.

The rhomboid prisms 39, shown in FIG. 3, displace the shaped beams emitted by lenses 37, 38 without any other effect upon the beams, as the subject beams are totally reflected internally within the prisms 39 by two opposed 45 degree faces therein. Such rhomboid prisms are well known in the art and readily available from a variety of sources, such as Edmund Optics, Inc., Barrington, N.J.; Rolyn Optics, Co., Covina, Calif.; Fibercryst, Villeurbanne, France; or Altechna Co., Ltd., Vilnius, Lithuania. The displacement aligns the sensing beams 11, which exit the retroreflective detection system 100, generally central to the front face of the objective lens 26 of the detection system 100. This alignment allows the sensing beams 11 to be retroreflected from the sniper scope, or other optic of interest, and any retroreflected beams 14, return collimated to the sensing beams 11 and monostatically to the retroreflective detection system 100. The strength of the retroreflected return beam 14 from the target is directional to the sensing signal 11, such that the closer to monostatic the return beam 14 is to the sensing beam 11, the stronger the return; and conversely, the more bistatic the return beam 14, the weaker the return signal will be; in fact, the intensity of the retroreflected beam 14 falls off exponentially as a function of the bistatic angle (separations as low as 3 to 5 minutes arc show significant loss of signal and decrease in signal-to-noise ratio). Therefore, it is preferred that the sensing beams 11 be aligned to exit the detection system 100 within the central 50% of the objective lens 26, and more preferably, within the central 25% of the objective lens 26.

The retroreflected beams 14 from the target are initially gathered by the subject retroreflective detection system 100 by a conventional achromatic, compound refracting lens 26, further shaped by a field lens 27, and redirected through a bent path using the primary mirror 28 and a secondary mirror 29 (the redirection, using these mirrors, allows the optics within the subject detection system 100 to be packaged within less space—allowing the overall device to have a smaller profile), before reaching a filter 30. This filter 30 is a dual notch filter designed to pass only the wavelengths of the two lasers 35, 36, i.e. this filter has an optical density of 6 or greater at other than the particular laser wavelengths)—thereby, reducing ambient noise and effectively increasing the contrast of the retroreflected return signal within beam 14.

Lenses 31, 32, and 33 form a conventional eyepiece assembly to further focus the target image; wherein, lens 31 reshapes the image, lens 32 slightly diverges it, and lens 33 recolimates it. After this eyepiece assembly the image is directed onto a high sensitivity sensor 34, whose output is observed by the user. As stated, the high sensitivity sensor provides a multiplication effect of the intensity of the image, up to about 30,000 times, and the image intensifier may be a third generation imager; or a high sensitivity, back-illuminated CCD; or a high sensitivity wide dynamic range CMOS sensor, to further resolve the final retroreflected target image. The resolved image will appear to the user as a bright spot 48 as shown in FIG. 5.

Figure 5:
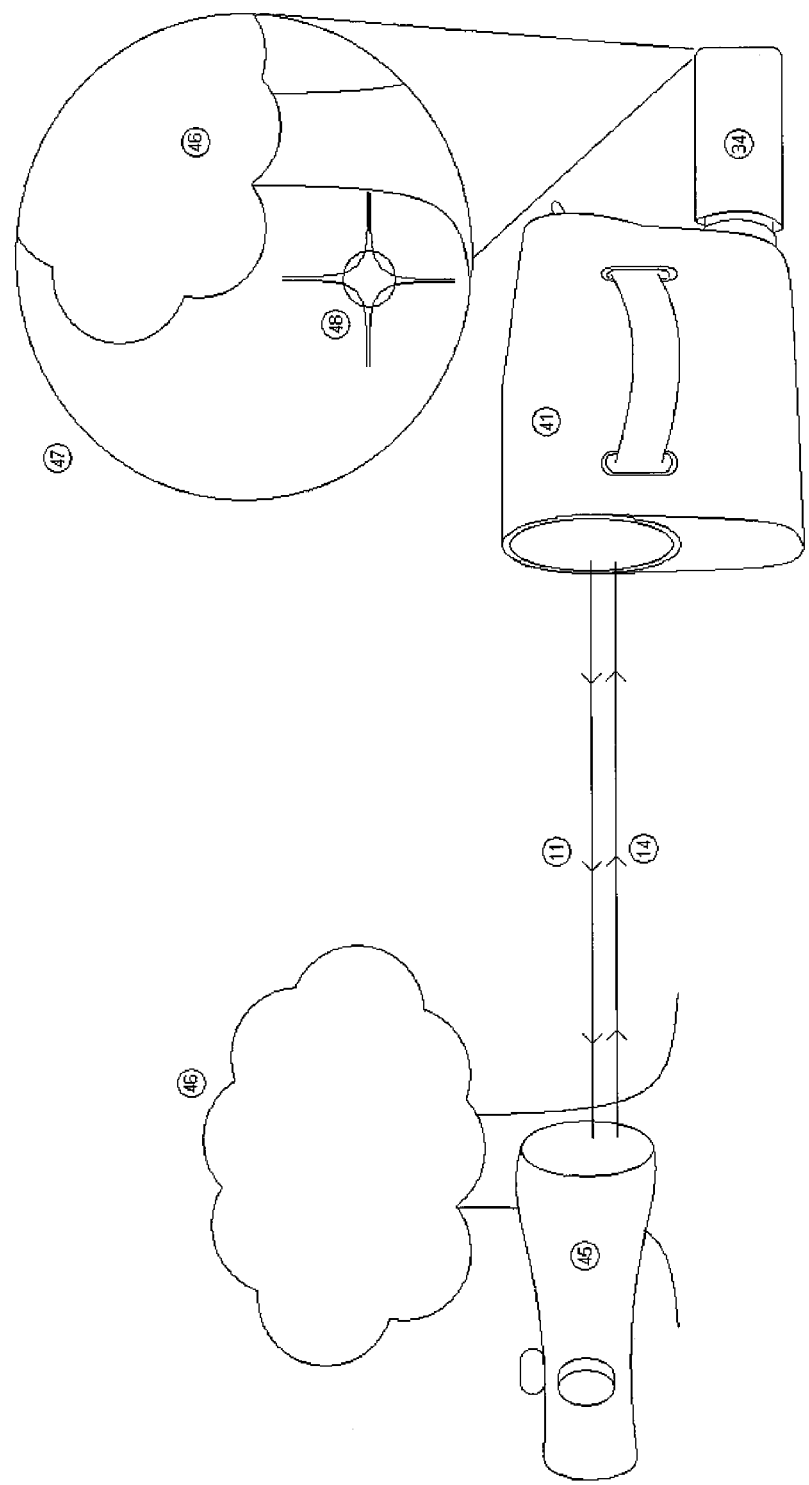
FIG. 5 is a conceptual diagram of the retroreflection detection system of the present invention observing a sniper scope, with a general representation of how the observed image would appear.

FIG. 5. shows a retroreflection detection system 41 of the present invention, with the eyepiece assembly and high sensitivity sensor combination 34, extending there from. As illustrated in FIG. 5, the sensing beam 11 from the retroreflection detection system 41 is retroreflected from a sniper scope 45, the target, and a return retroreflected beam 14 is returned collimated and monostatic to the retroreflection detection system 41. Section 47, illustrates what the user will observe, the bright retroreflected spot 48 from the target and the tree 46 adjacent to the target (such that the user will quickly and easily be able to locate the target).

What is claimed is:

1. A retroreflection detection system for the detection of optical systems, comprising:
   a near-IR laser, which emits a near-IR laser beam;
   a visible light laser, which emits a visible light laser beam;
   an achromatic objective lens having a front face which is parallel to the front of the detection system;
   a field lens located immediately behind said achromatic objective lens and having a front face which is parallel to the front face of said achromatic lens;
   a dual notch, dual band filter, which selectively transmits only visible and near-IR wavelength light;
   an eyepiece assembly;
   a high sensitivity sensor;
   means to selectively turn on either the near-IR laser, or both the visible light and near-IR lasers;
   means to shape both the near-IR and visible light laser beams into elongated, narrow, elliptical shapes;
   means to align said shaped laser beams, such that they are emitted from said detection system collimated to each other as sensing beams, which sensing beams are emitted generally central to the front face of said objective lens;
   whereby, if said sensing beams are retroreflected from said optical system, the retroreflected return beams will be monostatic to said sensing beams and will enter the front face of the objective lens generally central thereto and pass through the objective lens and then through the field lens as a focused and magnified beam, which beam is then passed through the dual notch filter, the eyepiece and the high sensitivity sensor, as a focused and enhanced beam which is seen as a bright spot within its surroundings.

2. The retroreflection detection system of claim 1, wherein said means to selectively turn on either the near-IR laser, or both the visible light and near-IR lasers is a selector switch that completes an electrical circuit between a battery power source and the near-IR laser, or both the visible light laser and near-IR lasers, to power-up said near-IR or both the near-IR and visible light lasers.

3. The retroreflection detection system of claim 1, wherein said means to shape both the near-IR and visible light laser beams into a generally elongated, narrow, elliptical shape is through a diverging lens, wedge prism, and/or cylindrical lens.

4. The retroreflection detection system of claim 1, wherein said means to align said shaped laser beams is a rhomboid prism positioned such that the shaped laser beam is repositioned to be emitted generally central to the front face of said objective lens.

5. The retroreflection detection system of claim 1, wherein said image intensifier is a highly sensitive detector, selected from the group consisting of a third generation imager, a high sensitivity, back-illuminated CCD, and a high sensitivity wide dynamic range CMOS device.

6. The retroreflection detection system of claim 1, wherein the visible light laser is selected from the group consisting of visible light gas lasers, visible light semiconductor lasers, and visible light solid state lasers.

7. The retroreflection detection system of claim 1, wherein the near-IR is a solid state near-IR laser or a semiconductor near-IR laser.

8. The retroreflection detection system of claim 6, wherein the visible light laser is a neodymium yttrium aluminum garnet laser.

9. The retroreflection detection system of claim 7, wherein the near-IR light laser is a neodymium yttrium aluminum garnet laser.

10. The retroreflection detection system of claim 1, wherein the focused and magnified beam from the field lens is redirected through a bent path using a primary mirror and a secondary mirror to the dual notch filter, thereby reducing the profile of the retroreflection detection system.

* * * * *